(12) United States Patent
Smith et al.

(10) Patent No.: US 11,645,129 B2
(45) Date of Patent: May 9, 2023

(54) DYNAMICALLY-IMPOSED FIELD AND METHOD TYPE RESTRICTIONS FOR MANAGED EXECUTION ENVIRONMENTS

(71) Applicant: Oracle International Corporation, Redwood Shores, CA (US)

(72) Inventors: Daniel Lee Smith, Spanish Fork, UT (US); John Robert Rose, San Jose, CA (US); Brian Goetz, Williston, VT (US); Frederic Parain, Sudbury, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/571,323

(22) Filed: Jan. 7, 2022

(65) Prior Publication Data

US 2022/0300263 A1    Sep. 22, 2022

Related U.S. Application Data

(60) Provisional application No. 63/163,701, filed on Mar. 19, 2021, provisional application No. 63/163,697, (Continued)

(51) Int. Cl.
*G06F 9/44* (2018.01)
*G06F 9/54* (2006.01)
(Continued)

(52) U.S. Cl.
CPC .............. *G06F 9/547* (2013.01); *G06F 8/41* (2013.01); *G06F 8/437* (2013.01);
(Continued)

(58) Field of Classification Search
None
See application file for complete search history.

(56) References Cited

U.S. PATENT DOCUMENTS 10,929,106 B1 *   2/2021   Sridhar .................... G06F 8/33
10,983,771 B1 *   4/2021   Hegarty .................. G06F 8/437
(Continued)

FOREIGN PATENT DOCUMENTS

| EP | 1533696 A2 | 5/2005 |
|----|------------|--------|
| EP | 1588235 A2 | 10/2005 |

(Continued)

OTHER PUBLICATIONS

"clojure.spec—Rationale and Overview," Retrieved at https://clojure.org/about/spec, Retrieved on Jan. 17, 2022, pp. 1-15.
(Continued)

*Primary Examiner* — Insun Kang
(74) *Attorney, Agent, or Firm* — Invoke

(57) ABSTRACT

A data structure (e.g., field, method parameter, or method return value) is defined by a descriptor to be of a particular type, which imposes a first set of restrictions on values assumable by the data structure. Separately, the data structure is associated with a type restriction that defines a second set of restrictions that further restricts the values assumable by the data structure. The descriptor and type restriction are encoded separately in a program binary. Responsive to identifying a value for the data structure that (a) is not forbidden by the first set of restrictions defined the descriptor and (b) is forbidden by the second set of restrictions defined by the type restriction, a runtime environment may perform a restrictive operation, such as: blocking storage of the value to a field; blocking passing of the value to a method parameter; or blocking return of the value from a method.

20 Claims, 6 Drawing Sheets

Related U.S. Application Data filed on Mar. 19, 2021, provisional application No. 63/163,723, filed on Mar. 19, 2021, provisional application No. 63/163,726, filed on Mar. 19, 2021.

(51) Int. Cl.

| | |
|---|---|
| *G06F 8/41* | (2018.01) |
| *G06F 16/28* | (2019.01) |
| *G06F 16/22* | (2019.01) |
| *G06F 9/448* | (2018.01) |
| *G06F 9/445* | (2018.01) |
| *G06F 9/30* | (2018.01) |
| *G06F 9/451* | (2018.01) |
| *G06F 12/02* | (2006.01) |
| *G06F 9/455* | (2018.01) |

(52) U.S. Cl.
CPC ........ *G06F 9/30076* (2013.01); *G06F 9/4488* (2018.02); *G06F 9/4494* (2018.02); *G06F 9/4498* (2018.02); *G06F 9/44521* (2013.01); *G06F 9/44536* (2013.01); *G06F 9/451* (2018.02); *G06F 9/45516* (2013.01); *G06F 9/541* (2013.01); *G06F 9/542* (2013.01); *G06F 9/548* (2013.01); *G06F 12/023* (2013.01); *G06F 16/2272* (2019.01); *G06F 16/2291* (2019.01); *G06F 16/289* (2019.01)

(56) References Cited

U.S. PATENT DOCUMENTS

| | | | |
|---|---|---|---|
| 2009/0182760 A1* | 7/2009 | Box | G06F 16/8373 707/999.102 |
| 2013/0067155 A1* | 3/2013 | Bates | G06F 8/00 711/E12.098 |
| 2013/0080736 A1 | 3/2013 | Meirowitz et al. | |
| 2015/0301840 A1 | 10/2015 | Goetz et al. | |
| 2017/0116007 A1 | 4/2017 | Cimadamore et al. | |
| 2017/0123771 A1* | 5/2017 | Smith | G06F 8/437 |
| 2018/0285361 A1* | 10/2018 | Buckley | G06F 9/45504 |
| 2020/0019423 A1* | 1/2020 | Marks | G06F 8/443 |
| 2020/0026530 A1* | 1/2020 | Rose | G06F 9/44526 |
| 2021/0240619 A1* | 8/2021 | Earnshaw | G06F 12/0802 |

FOREIGN PATENT DOCUMENTS

| | | |
|---|---|---|
| EP | 1640859 A2 | 3/2006 |
| WO | 2004/068292 A2 | 8/2004 |
| WO | 2015/164438 A1 | 10/2015 |

OTHER PUBLICATIONS

"Common Descriptor Concepts," Retrieved at https://www.eclipse.org/eclipselink/documentation/2.6/concepts/descriptors001.htm, Retrieved on Oct. 31, 2017, pp. 1-6.

"JEP 218: Generics over Primitive Types" Retrieved at https://openjdk.java.net/jeps/218, Retrieved on 2022, pp. 1-4.

"Project Valhalla" Retrieved at https://openjdk.java.net/projects/valhalla/, Retrieved on Dec. 2021, pp. 1-3.

"Statically typed Javascript: Why and How," Retrieved at https://developerhowto.com/2019/01/05/statically-typed-javascript-why-and-how/, Retrieved on Jan. 2019, pp. 1-6.

"Template Classes in the VM" Retrieved at http://cr.openjdk.java.net/~jrose/values/template-classes.html, Retrieved on Nov. 2017, pp. 1-15.

Buckle N., "Restricted data types, specification and enforcement of invariant properties of variables," ACM SIGPLAN Notices, vol. 12, Issue 3, Mar. 1977, pp. 68-76.

Cimadamore I, M., "Constructs and Applications of Generic Programming in Object-Oriented Languages," University of Bologna, 2010, pp. 208.

Kennedy A., et al., "Design and Implementation of Generics for the .NET Common Language Runtime," ACM SIGPLAN Notices, vol. 36, Issue 5, May 2001, pp. 1-12.

Malabarba S, et al., "Runtime Support for Type-Safe Dynamic Java Classes," Lecture Notes in Computer Science, vol. 1850, 2000, pp. 337-361.

Rose J., "Template Class Challenges" Retrieved at http://cr.openjdk.java.net/~jrose/values/Templates-2019-0325.pdf, Retrieved on Mar. 2019, pp. 1-16.

Rose J., "The Saga of the Parametric VM," Retrieved at http://rosehome.org/work/pvm20211216/parametric-vm.pdf, Retrieved on Jan. 2021, pp. 1-33.

Wikipedia., "Entity-relationship model," Retrieved at https://en.wikipedia.org/wiki/Entity%E2%80%93relationship_model, Retrieved on Dec. 2021, pp. 1-12.

\* cited by examiner

DYNAMICALLY-IMPOSED FIELD AND METHOD TYPE RESTRICTIONS FOR MANAGED EXECUTION ENVIRONMENTS

RELATED APPLICATIONS; INCORPORATION BY REFERENCE

This application hereby incorporates by reference the following applications: Application No. 63/163,697, filed on Mar. 19, 2021, titled "Dynamically Imposed Field and Method Type Restrictions For Managed Execution Environments"; Application No. 63/163,701, filed on Mar. 19, 2021, titled "Optional Specialization of Generic Types and Methods"; Application No. 63/163,723, filed on Mar. 19, 2021, titled "Encapsulated Specialization of Dynamically-Linked API Points"; Application No. 63/163,726, filed on Mar. 19, 2021, titled "Pointwise and Replicative Type Specializations"; application Ser. No. 17/571,328, filed on Jan. 7, 2022 titled "Implementing Optional Specialization When Executing Code"; application Ser. No. 17/571,329, filed on Jan. 7, 2022 titled "Implementing Optional Specialization When Compiling Code"; application Ser. No. 17/571,335, filed on Jan. 7, 2022 titled "Determining different resolution states for a parametric constant in different contexts"; application Ser. No. 17/571,340, filed on Jan. 7, 2022 titled "Determining a resolution state of an anchor constant associated with an application programming interface (API) point"; application Ser. No. 17/571,343, filed on Jan. 7, 2022 titled "Executing a parametric method within a specialized context"; application Ser. No. 17/571,349, filed on Jan. 7, 2022 titled "Instantiating a parametric class within a specialized context"; application Ser. No. 17/571,353, filed on Jan. 7, 2022 titled "Accessing a parametric field within a specialized context"; application Ser. No. 17/571,356, filed on Jan. 7, 2022 titled "Implementing a type restriction that restricts to a non-polymorphic layout type or a maximum value"; application Ser. No. 17/571,359, filed on Jan. 7, 2022 titled "Implementing a type restriction that restricts to a singleton value or zero values" and application Ser. No. 17/571,379, filed on Jan. 7, 2022 titled "Implementing a type restriction that restricts to a maximum or specific element count". The Applicant hereby rescinds any disclaimer of claim scope in the parent application or the prosecution history thereof and advises the USPTO that the claims in this application may be broader than any claim in the parent application.

TECHNICAL FIELD

The present disclosure relates to managed runtime environments. In particular, the present disclosure relates to dynamically imposing restrictions on field and/or method types within a managed runtime environment.

BACKGROUND

Managed execution environments, such as the Java Virtual Machine (JVM) and Common Language Runtime (CLR), have a type system which symbolically encodes types of fields and methods. Such a symbolic encoding is sometimes called a type descriptor or type signature. If a type cannot be symbolically encoded as a descriptor, it cannot be imposed on a field or method.

Exotic types not already described by an existing type descriptor (e.g., null-free references, flattened objects, range-limited numerics, fixed-size arrays) cannot be added to such a system without extending the descriptor grammar. Such an extension is difficult because it affects the entire managed environment. For example, when CLR added generics, they added new syntaxes to descriptors, requiring a re-work of all parts of the managed environment, and making support of the newly declared types required at all points of the system.

Beside the difficulty of changing the descriptor grammar, such changes are also hard to evolve. If a second wave of types is added, and a third wave is found to be required later, both waves must be supported forever.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. TYPE RESTRICTIONS
4. DYNAMICALLY IMPOSING TYPE RESTRICTIONS
5. MISCELLANEOUS; EXTENSIONS
6. HARDWARE OVERVIEW

1. General Overview

One or more embodiments include dynamically imposing field and method type restrictions for managed execution environments. The system may include a plurality of application programming interface (API) points (e.g., named classes, interfaces, methods, constructors, or fields). The system may allow descriptors to be contextually modified by an additional attribute attached to an API point, called a type restriction. In some embodiments, the type restriction attribute may be isolated. Alternatively, the type restriction attribute may be presented in combination with other information, such as with the class file. The type restriction does not cancel or replace the effect of the existing type descriptor on the field or method, but rather includes information which forbids a value of the API point that would otherwise be permitted based on the type descriptor (the type expressed in the descriptor syntax). In the case of a method, restrictions may be placed on any or all of the methods parameters and/or the return type.

Imposing the type restriction (e.g., a dynamically variable type system) in addition to the type descriptor (e.g., a fixed type system) preserves the benefits of the existing type descriptor system while adding additional benefits of the type restriction, such as improving type representation to increase efficiency of the managed execution environment.

One or more embodiments described in this Specification and/or recited in the claims may not be included in this General Overview section.

2. Architectural Overview

Figure 1:
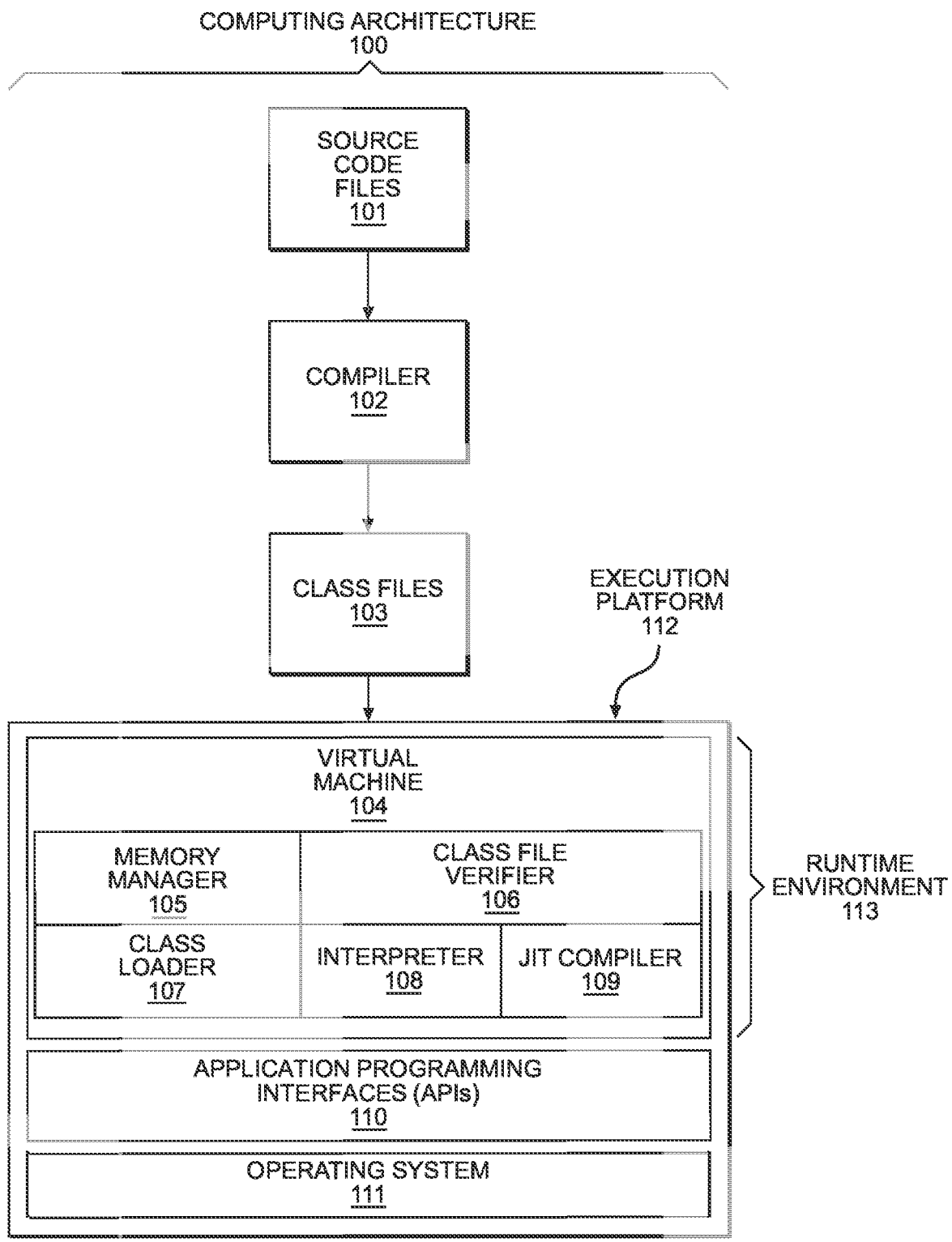
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionalities than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above-described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
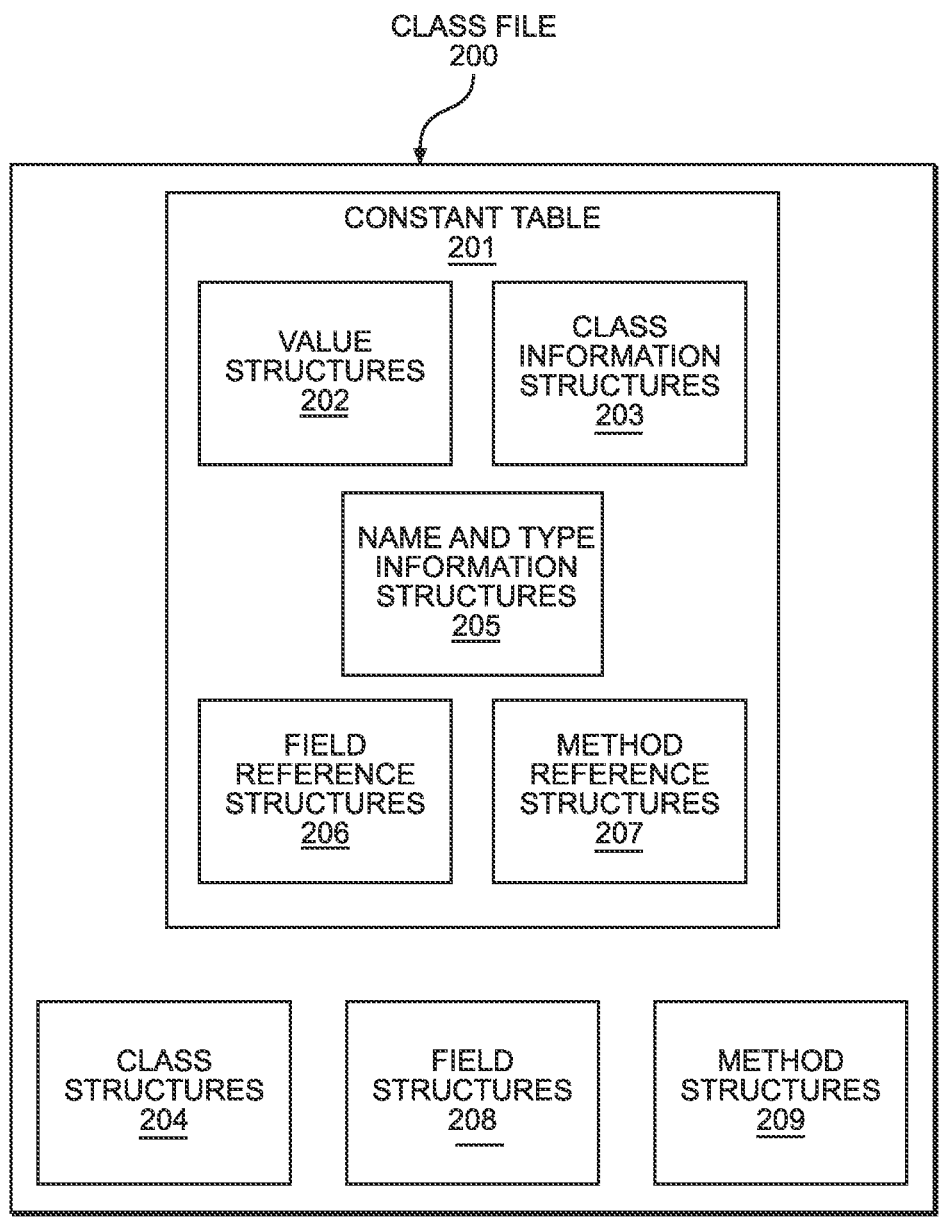
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206 and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 (also referred to as "class metadata") includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
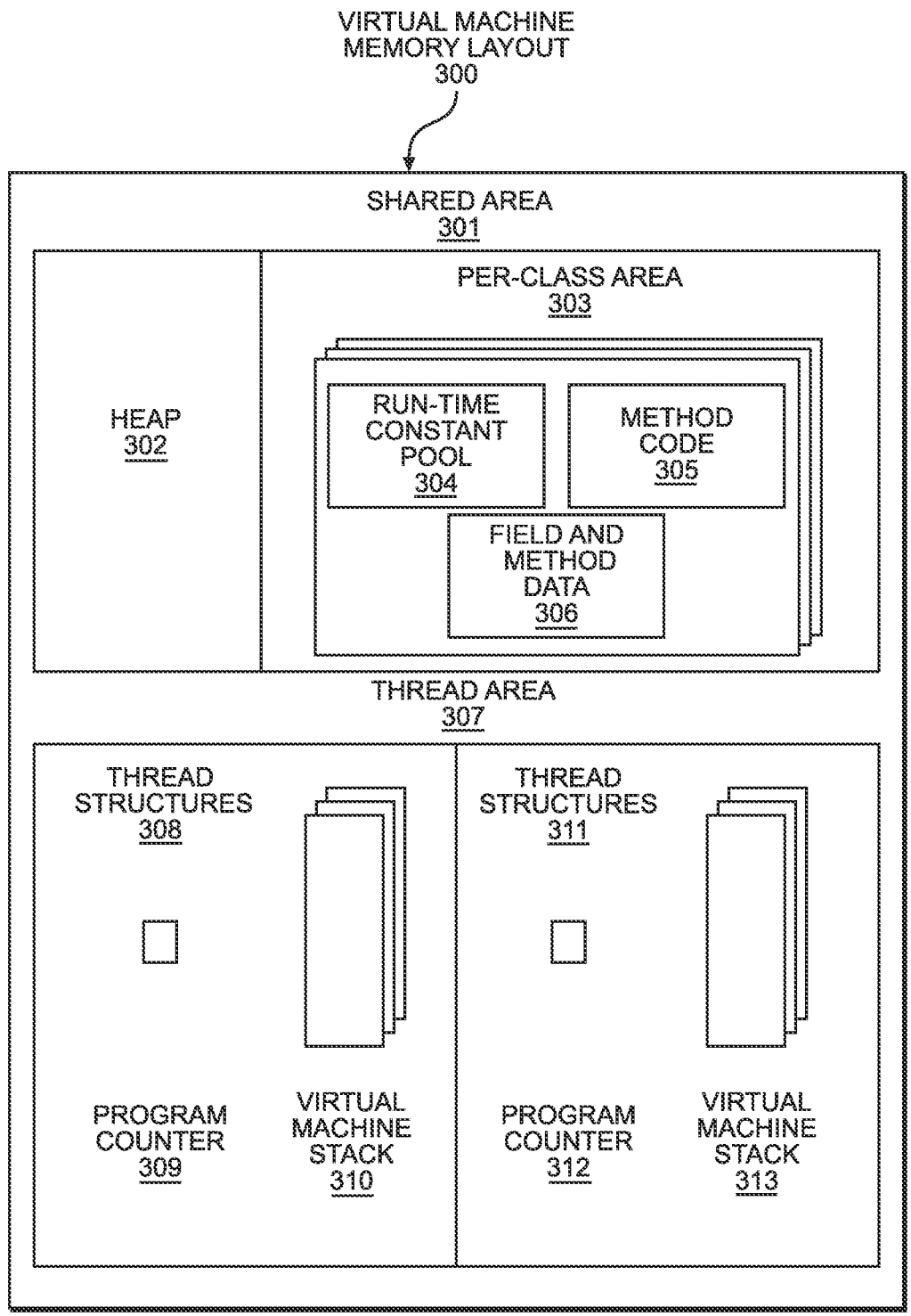
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread. When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
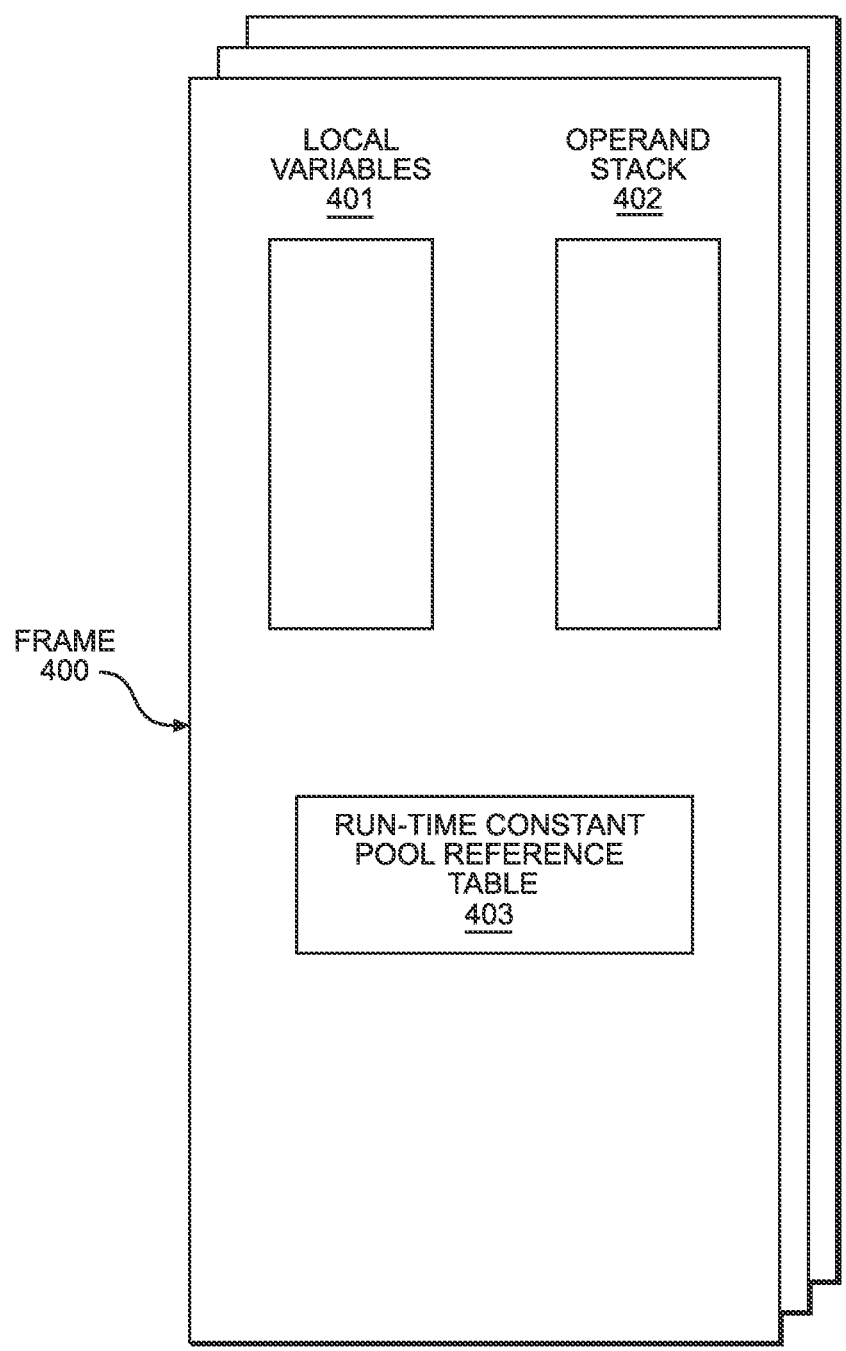
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Type Restrictions

A type restriction may include information that contextually modifies an existing type descriptor.

In embodiments, the type restriction may be presented in combination with other information, such as a type specialization. Alternatively, the type restriction may be presented alone, separate from other information. The type restriction may be presented at any time prior to the system accessing an API point to which the type restriction is applied. For example, type restrictions can be presented at compile time, at link time, at class loading time, and/or at optimization time.

The type restriction does not cancel or otherwise override the effect of the existing type descriptor on the field or method. Rather the type descriptor may declare that one or more values of the field or method's type (e.g., the type expressed in the descriptor syntax) are forbidden (e.g., restricted) for this particular field.

In the case of a field, the type restriction may be applied to the value of the field. In the case of a method, the type restriction may be applied to one or more of the parameters and/or the return type.

In embodiments, a type restriction may be determined dynamically. For example, a type restriction may refer to a dynamically resolved constant. The dynamically resolved constant may include a reference to an object which the managed runtime is free to interpret in any agreed manner.

4. Dynamically Imposing Type Restrictions

Figure 5:
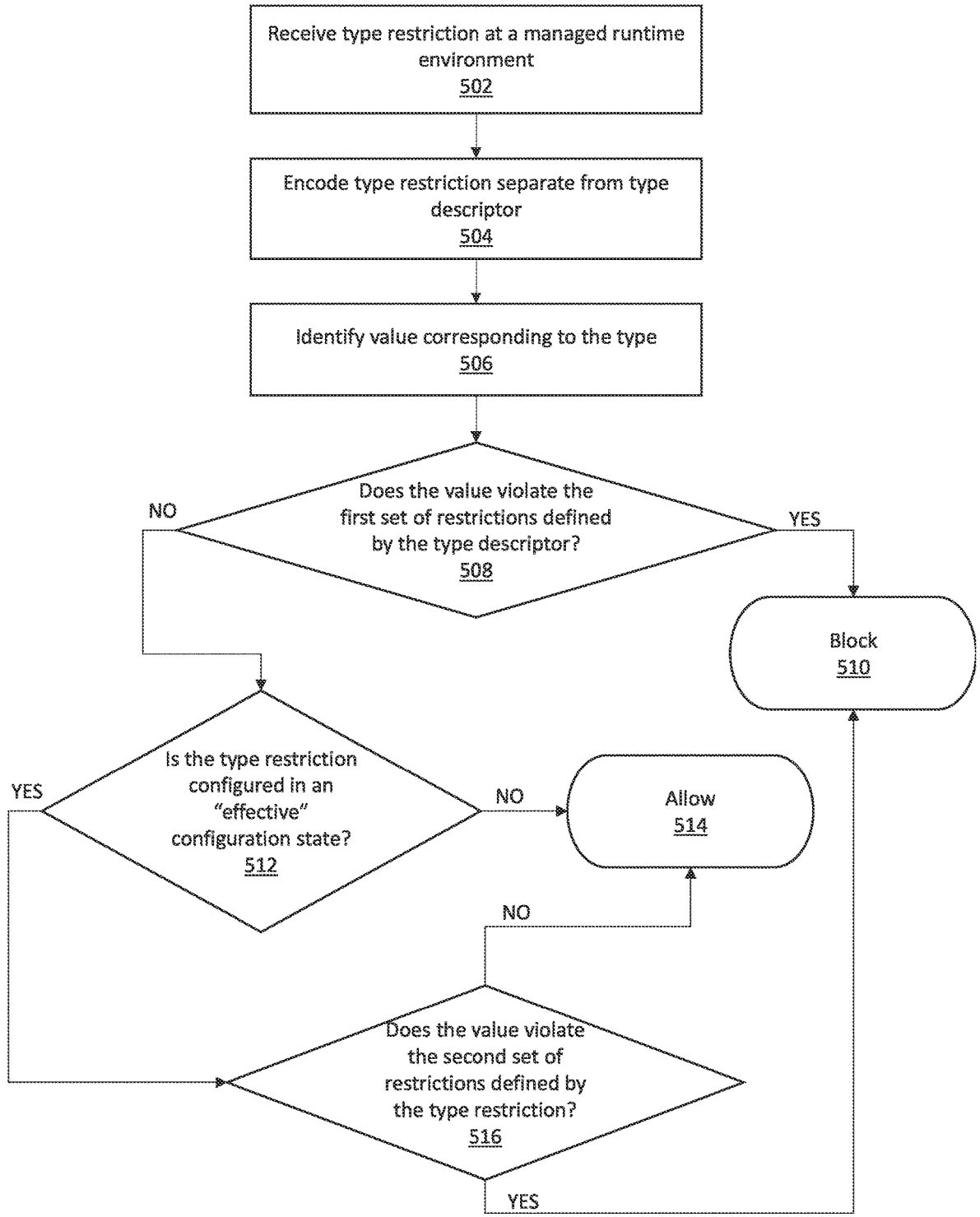
FIG. 5 illustrates a set of operations for dynamically imposing type restrictions in accordance with one or more embodiments.

FIG. 5 illustrates a flowchart showing techniques for applying type restrictions to a type or API point (e.g., a class, interface, method, constructor or field). One or more operations illustrated in FIG. 5 may be modified, rearranged, or omitted all together. Accordingly, the particular sequence of operations illustrated in FIG. 5 should not be construed as limiting the scope of one or more embodiments.

The system can identify a particular type. The particular type may correspond to one of a field, a method parameter, of a method return type. The type may be defined by a type descriptor, which defines a first set of restrictions for values of objects of the particular type. The type may also include, for example, information regarding data representation within the type and uses of data outside the type. That is, the type may include a value space for values stored in the type, an external API for the type, and/or and internal representation of the type.

The system may receive a type restriction at a managed runtime environment (Operation 502). In embodiments, the type restriction may include a second set of one or more restrictions to a value of the particular type. For example, the second set of type restrictions may limit the particular type to non-NULL values, impose a limit on a numerical range, and/or require arrays of a fixed size. There are many different type restrictions possible. The restrictions placed on the value of the particular type may be established by the system and/or manually described by a user.

In embodiments, the type restriction may be received as an object. Alternatively, the type restriction may be a dynamically-resolved constant that includes a reference to an object. Because type restrictions are represented as objects, it is easier to evolve the system to introduce new kinds of types. For example, new typing features may not require changes to a binary file format of a program.

The set of type restrictions does not cancel the effect of the types defined by the type descriptor. Rather, the type restriction may be used to contextually modify the type descriptor, forbidding one or more values of the type that would otherwise be allowed by the type descriptor. That is, the type restriction imposes additional restrictions on the value of the particular type.

The system may encode the type restriction (e.g., the set of restrictions placed on the value of an API point) in a program binary (Operation 504). The type restriction may be encoded separately from the traditional type descriptor.

The system may identify a value corresponding to the particular type (Operation 506). For example, the system may identify a value that is intended to be stored to a field, a value that is intended to be passed as a parameter to a method, or a value that is intended to be returned as a return value for a method.

The system may determine if the value violates the first set of restrictions placed on values for the particular type (Operation 508). For example, the system may retrieve the first set of restrictions defined by the type descriptor. The system may evaluate the identified value to determine if the identified value violates at least one of the first set of restrictions.

If the identified value violates one or more of the first set of restrictions (YES in Operation 508), the system may perform a restrictive operation to block the value from being used by the type (Operation 510). In embodiments, the restrictive operation may include, for example, blocking storage of the value to a field, blocking the passing of the value to a method parameter, and/or blocking the return of the value from a method. In particular, when an invalid value is found not to comply with a type restriction, and is "blocked", the system may take one or more of the following actions: (a) aborting the operation by raising an exception or error; (b) nullifying the operation by making it a no-op (e.g., a field store is dropped); (c) completing the operation with an alternative known value that complies with the type restriction (e.g., zero); (d) completing the operation with an alternative value derived from the invalid value, that complies with the type restriction (e.g., an unboxed and/or range-clipped version of the original operand); (e) emitting a diagnostic, such as a warning (typically in combination with either (c) or (d) from the list).

Alternatively, if the identified value does not violate any of the first set of restrictions (NO in Operation 508), the system may determine if the type restriction is configured in an effective configuration state (Operation 512). In particular, the type restriction may be stored in either an effective configuration state or an ineffective configuration state. The configuration state may be altered based on the runtime environment. A type restriction configured in an effective configuration state may block the storage of forbidden values into a field, block the passing of forbidden values in one or more method parameters, or block the return of a forbidden value from a method. Alternatively, a type restriction configured in an ineffective configuration state has none of these effects. However, type restrictions configured in an ineffective configuration state may be useful in some use cases, and may serve as a fallback to the simple meaning of the type descriptor, which is always present and always enforced.

The configurable nature of the type restrictions may allow a set of type restriction objects which are recognized as effective type restrictions to change over time. For example, type restriction objects may be periodically removed from circulation, or applied only when the managed runtime is started with a particular configuration. Additionally, more type restrictions may be added as new kinds of restriction-based optimizations are added. Because of this changeability, type restrictions are inherently more flexible than type descriptors, which have either a fixed syntax, or a slowly-evolving one.

If the type restriction is not configured in an effective configuration state (NO in Operation 512), the system may allow the value to be used by the type (Operation 514). Permitting the value to be used by the type may include, for example, permitting storage of the value to a field, permitting the passing of the value to a method parameter, and/or permitting the return of the value from a method.

Alternatively, if the type restriction is configured in the effective configuration state (YES in Operation 512), the system may determine if the value violates the second set of restrictions placed on values for the particular type by the type restriction (Operation 516). For example, the system may retrieve the second set of restrictions defined by the type restriction. The system may evaluate the identified value to determine if the identified value violates at least one of the second set of restrictions. If the identified value violates one or more of the second set of restrictions (YES in Operation 512), the system may perform a restrictive operation to block the value from being used by the type (Operation 510). Alternatively, if the identified value does not violate any of the first set of restrictions (NO in Operation 508), the system may allow the value to be used by the type (Operation 514).

In embodiments, application of type restrictions according to the flowchart may allow the system to improve representation of a particular type, thus increasing efficiency when performing operations using the type. As an example, the system may improve the container for an object to better fit the fields of the object based on the type restriction. That is, if a particular field uses the object descriptor for the type Object, but include a type restriction that restricts the field to Integer values, the system may configure the object container to include an Integer field rather than an Object field. Similarly, the system may improve the calling sequence for a method to better fit the method signature based on the type restriction.

Additionally, type restrictions give the system additional information that can be used to help improve performance. For example, a "null-free" type restriction (e.g., a restriction that forbids a field from containing a value of NULL) allows subsequent code execution to avoid any null checks.

Further, because type restrictions separate API descriptor types from internal implementation type checks, enhancements to the execution environment could allow different objects to support the same class-level API while having different type restrictions. This enables uses where legacy APIs (e.g., APIs with type descriptors that pre-date type restrictions and optimizations enabled by the type restrictions) can co-exist with optimized type-restricted objects. That is, use of type restrictions allows many components (legacy and/or modern) of a large system to interoperate with each other using a standard API with simple type descriptors, while allowing different parts of the system to agree upon type restrictions which benefit the components in a local sense.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
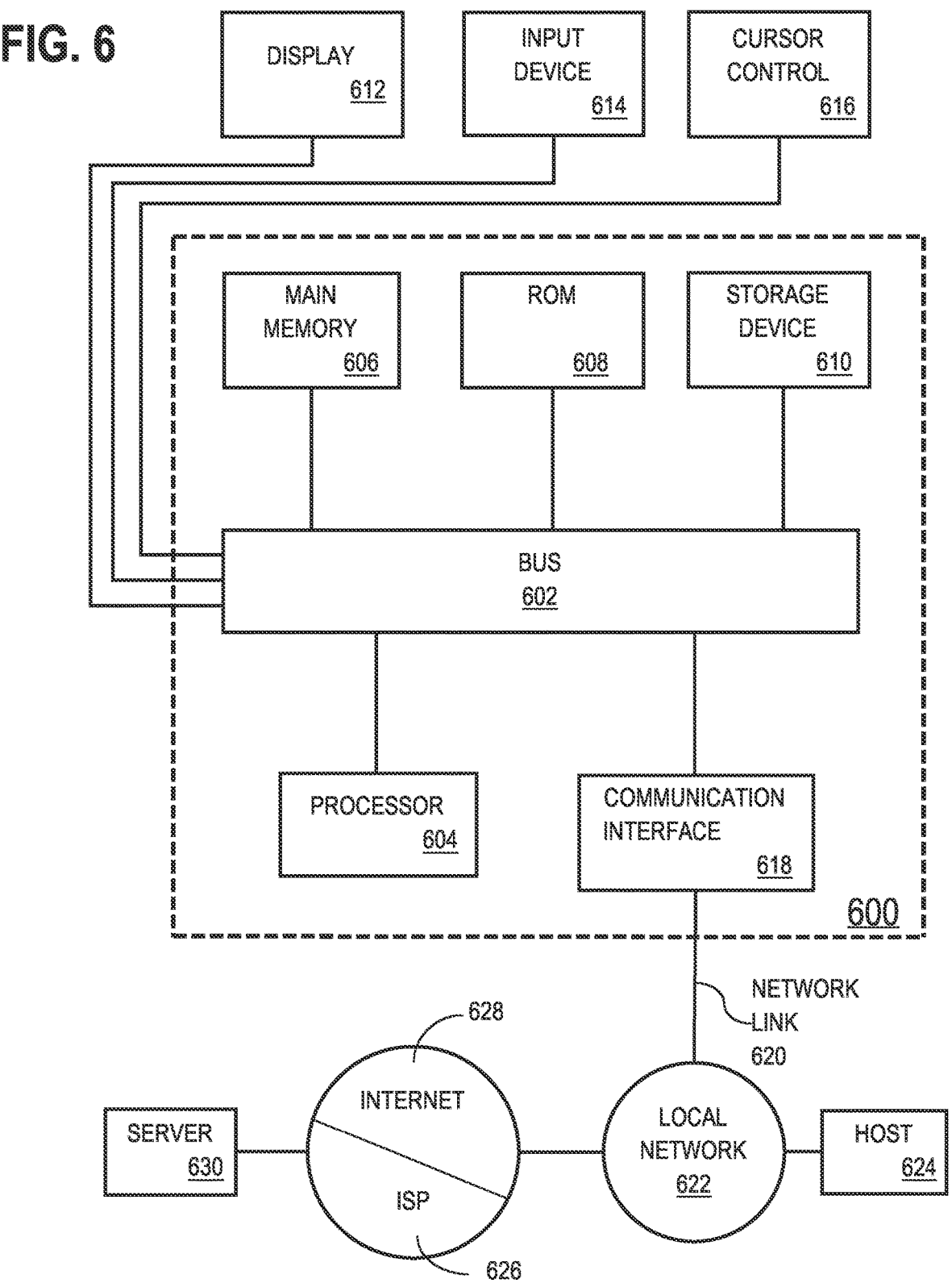
FIG. 6 illustrates a system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable storage media comprising instructions which, when executed by one or more hardware processors, causes performance of operations comprising:
   identifying a particular type that is (a) defined by a descriptor that defines a first set of restrictions for values of objects of the particular type and (b) corresponds to one of: a field type, a method parameter type or a method return type;
   receiving, at a managed runtime environment, a type restriction that defines a second set of restrictions that further restricts the values of objects of the particular type;
   encoding, by the managed runtime environment in a program binary, the type restriction separately from the descriptor to apply the second set of restrictions in addition to the first set of restrictions for the values of objects of the particular type;
   responsive to identifying a value for the particular type that (a) is not forbidden by the first set of restrictions defined by the descriptor of the particular type and (b) is forbidden by the second set of restrictions defined by the type restriction:
      performing a restrictive operation comprising one or more of:
         blocking storage of the value to a field;
         blocking passing of the value to a method parameter; or
         blocking return of the value from a method.

2. The medium of claim 1, wherein the type restriction is configurable in (a) an effective configuration such that the second set of restrictions is applied to the values of objects of the particular type and (b) an ineffective configuration such that the second set of restrictions is not applied to the values of objects of the particular type.

3. The medium of claim 1, wherein the type restriction is received together with type specialization data.

4. The medium of claim 1, wherein the type restriction is received at compile time.

5. The medium of claim 1, wherein the descriptor is received at a first time, and the type restriction is received at second time following the first time.

6. The medium of claim 1, the operations further comprising:
   determining that the type restriction is configured in an effective configuration state,
   wherein performing the restrictive operation is performed in response to determining that the type restriction is configured in the effective configuration state.

7. The medium of claim 1, wherein performing the restrictive operation comprises performing one or more of:
   aborting an operation that includes the identified value;
   altering the operation that includes the identified value to make the operation a no-op;
   completing the operation that includes the identified value by replacing the identified value with a value that complies with the second set of restrictions; or
   emitting a diagnostic message.

8. A method comprising:
   identifying a particular type that is (a) defined by a descriptor that defines a first set of restrictions for values of objects of the particular type and (b) corresponds to one of: a field type, a method parameter type or a method return type;
   receiving, at a managed runtime environment, a type restriction that defines a second set of restrictions that further restricts the values of objects of the particular type;
   encoding, by the managed runtime environment in a program binary, the type restriction separately from the descriptor to apply the second set of restrictions in addition to the first set of restrictions for the values of objects of the particular type;
   responsive to identifying a value for the particular type that (a) is not forbidden by the first set of restrictions defined by the descriptor of the particular type and (b) is forbidden by the second set of restrictions defined by the type restriction:
      performing a restrictive operation comprising one or more of:
         blocking storage of the value to a field;
         blocking passing of the value to a method parameter; or
         blocking return of the value from a method,
   wherein the method is performed by at least one device including a hardware processor.

9. The method of claim 8, wherein the type restriction is configurable in (a) an effective configuration such that the second set of restrictions is applied to the values of objects of the particular type and (b) an ineffective configuration such that the second set of restrictions is not applied to the values of objects of the particular type.

10. The method of claim 8, wherein the type restriction is received together with type specialization data.

11. The method of claim 8, wherein the type restriction is received at compile time.

12. The method of claim 8, wherein the descriptor is received at a first time, and the type restriction is received at second time following the first time.

13. The method of claim 8, further comprising:
    determining that the type restriction is configured in an effective configuration state, wherein performing the restrictive operation is performed in response to determining that the type restriction is configured in the effective configuration state.

14. The method of claim 8, wherein performing the restrictive operation comprises performing one or more of:
    aborting an operation that includes the identified value;
    altering the operation that includes the identified value to make the operation a no-op;
    completing the operation that includes the identified value by replacing the identified value with a value that complies with the second set of restrictions; or
    emitting a diagnostic message.

15. A system comprising:
    at least one device including a hardware processor;
    the system being configured to perform operations by the at least one device comprising:
    identifying a particular type that is (a) defined by a descriptor that defines a first set of restrictions for values of objects of the particular type and (b) corresponds to one of: a field type, a method parameter type or a method return type;
    receiving, at a managed runtime environment, a type restriction that defines a second set of restrictions that further restricts the values of objects of the particular type;
    encoding, by the managed runtime environment in a program binary, the type restriction separately from the descriptor to apply the second set of restrictions in addition to the first set of restrictions for the values of objects of the particular type;
    responsive to identifying a value for the particular type that (a) is not forbidden by the first set of restrictions defined by the descriptor of the particular type and (b) is forbidden by the second set of restrictions defined by the type restriction:
    performing a restrictive operation comprising one or more of:
        blocking storage of the value to a field;
        blocking passing of the value to a method parameter; or
        blocking return of the value from a method.

16. The system of claim 15, wherein the type restriction is configurable in (a) an effective configuration such that the second set of restrictions is applied to the values of objects of the particular type and (b) an ineffective configuration such that the second set of restrictions is not applied to the values of objects of the particular type.

17. The system of claim 15, wherein the type restriction is received together with type specialization data.

18. The system of claim 15, wherein the descriptor is received at a first time, and the type restriction is received at second time following the first time.

19. The system of claim 15, the operations further comprising:
    determining that the type restriction is configured in an effective configuration state,
    wherein performing the restrictive operation is performed in response to determining that the type restriction is configured in the effective configuration state.

20. The system of claim 15, wherein performing the restrictive operation comprises performing one or more of:
    aborting an operation that includes the identified value;
    altering the operation that includes the identified value to make the operation a no-op;
    completing the operation that includes the identified value by replacing the identified value with a value that complies with the second set of restrictions; or
    emitting a diagnostic message.

* * * * *